000
United States Patent Office 3,026,362
Patented Mar. 20, 1962

3,026,362
SEPARATION AND UTILIZATION OF
ISOBUTYLENE
Charles H. McKeever, Meadowbrook, Pa., assignor to Rohm & Haas Company, Philadelphia, Pa., a corporation of Delaware
No Drawing. Filed June 5, 1959, Ser. No. 818,249
20 Claims. (Cl. 260—677)

This invention concerns the efficient separation and utilization of isobutylene from mixtures of gases containing isobutylene. More particularly, it concerns the production of pure isobutylene from refinery streams containing isobutylene in admixture with numerous other hydrocarbons. It also concerns the recovery of pure isobutylene from refinery streams which contain relatively small amounts of isobutylene.

In the manufacture of pure isobutylene, a major portion of the cost is in isolation of the isobutylene in pure form from the crude refinery or cracked gas streams. Several rather involved isolation procedures are customarily employed. First, the refinery stream is fractionated by low temperature fractional distillation under slight pressure. The isobutylene-rich distillate cut still contains appreciable amounts of butene-1 and some saturates which boil very close to isobutylene. This distillate cut is next contacted with 62% to 65% sulfuric acid. All the isobutylene and small amounts of butenes are absorbed, the saturates are not. At least two methods are used for recovering the isobutylene from the sulfuric acid. The acid may be diluted considerably and sparged with steam to remove the isobutylene which is then collected and fractionally distilled. This means that large amounts of sulfuric acid must be concentrated to the desired 62% to 65% before recycling. To avoid this, a second method has been devised. The 62% to 65% $H_2SO_4$ containing the isobutylene is allowed to stand or is warmed slightly. This causes the isobutylene to polymerize to di-, tri-, and tetraisobutylene. These low molecular weight polymers are insoluble in the sulfuric acid; consequently, they can be withdrawn. The sulfuric acid is recycled and the crude isobutylene polymers are then cracked to yield a crude isobutylene which is fractionated to produce pure isobutylene. Another process for the separation of isobutylene from a mixture of $C_4$ hydrocarbons which involves selective isomerization is described in U.S. Patent No. 2,421,229.

Other processes for the recovery and purification of isobutylene are set forth in U.S. Patent Nos. 2,380,350 and 2,443,245.

It has now been surprisingly and unexpectedly found that certain dehydrated sulfonic acid cation exchange resins possessing macro-reticular structures, when used under certain specified conditions, act as specific catalysts for the reaction of lower alkanoic acids with the isobutylene contained in mixtures of gaseous hydrocarbons such as in crude refinery streams containing a wide range of other olefins.

Although the refinery streams may contain as little as 10% to 20% isobutylene and at least 25% to 30% butene-1, butene-2, propylene, $C_5$ and higher olefins along with a wide variety of saturated hydrocarbons, only the isobutylene reacts with the lower alkanoic acid in the presence of the sulfonic acid cation exchange resins of the type hereinbefore described. No reaction of the other olefinic hydrocarbons is noted, even although they are present in large excess. Although it might be expected that the reaction with isobutylene would be preferred, the virtual exclusion of reaction with the other olefins though present in large excess is completely unexpected and demonstrates the remarkable selectivity of these catalysts under the conditions employed.

The term "macro-reticular" structure, as used hereinafter in the specification, examples, and in the claims, refers to a unique porous structure. It has been found that this structure is developed when monoethylenically unsaturated monomers are copolymerized with polyvinylidene monomers in the presence of certain compounds. Characteristic of these compounds is the fact that each is a solvent for the monomer mixture being copolymerized and exerts essentially no solvent action on said copolymer.

The ion exchange resins containing sulfonic acid groups prepared using said copolymers as intermediates also exhibit unusual and unexpected results.

The description and preparation of these new sulfonic acid type cation exchangers possessing macro-reticular structures is set forth in detail in copending application Serial No. 749,526, filed July 18, 1958, in the hands of a common assignee.

Prior to use as catalysts in the reaction of the present invention, the sulfonic acid type cation exchange resins should be freed from any strong acid present by washing with distilled or deionized water until there is no measurable amount of strong acid in the effluent wash water. One preferred method of removing traces of strong acid consists of washing the resin with deionized water with a quality of $10^6$ ohm-cm. until the effluent from the wash also has a quality of $10^6$ ohm-cm.

For use as catalysts in the process of the present invention, the sulfonic acid cation exchange resins of the type set forth hereinbefore must be dehydrated prior to use. One method of dehydration is drying at elevated temperatures under reduced pressure until a constant weight is obtained. Thus, drying at 105° C. to about 125° C. at a pressure of 5 to 10 mm. will effect dehydration. The resin may also be dehydrated by azeotropic distillation with an organic liquid, such as an aromatic or aliphatic hydrocarbon, until no water is obtained in the distillate. Typical hydrocarbons include heptane, isooctane, toluene, xylene, or mixtures thereof. The precise water content of the dehydrated resin produced by either of these dehydration processes is very difficult to determine, but either process will produce catalysts which are eminently satisfactory. The presence of water not only decreases the catalytic activity of the resin and tends to reverse the equilibrium of the reaction, but it will also increase the amount of tertiary alcohol which is produced. For similar reasons, it is important that the reactants be dried prior to the reaction. Well-known conventional methods of drying the reactants can be employed.

The acid anhydrides of the lower alkanoic acids hereinafter described may also be employed to effect removal of water from the resin and/or the feed stock and/or the reaction mixture. The amount of anhydride used should be at least equivalent to the water content of the feed stock, the reaction mixture, including the resin. It is preferred that the resin be dehydrated prior to use in the reaction, but the use of the acid anhydride is particularly advantageous when employing wet refinery streams. Under these conditions, to the mixture of refinery stream and lower alkanoic acid, is added an amount of the lower alkanoic acid anhydride equivalent to or slightly in excess of the water content of the mixture of refinery stream and lower alkanoic acid. This mixture is then heated to about 50° C. to about 90° C. to accelerate the reaction between the water and the anhydride, then cooled to about −10° to about 35° C. The dehydrated resin is then added and the rest of the reaction carried out as set forth hereinafter.

The ratio of moles of resin (a "mole" of resin is defined as the weight in grams of dehydrated resin per sulfonic acid group) per mole of mixed reactants, i.e. olefin and acid, will vary widely depending on whether a batch or a continuous process is employed. Thus, in a batch process, the ratios of moles resin to moles reactant mixture may vary from 0.001:1 to 0.25:1. A preferred ratio is from 0.02:1 to 0.10:1. In the preferred continuous process, it is difficult to state the ratios because one charge of resin can be used for prolonged periods to produce large quantities of esters. In any given section of the packed reactor, however, the ratio of the volume of the resin to the volume of the reactant mixture is substantially 1:1, since the resin as used has approximately 50% void volume.

Typical of the lower alkanoic acids which are suitable for use in the process of the present invention are acetic, propionic, butyric and isobutyric. Acetic acid is particularly preferred.

Glacial formic acid may also be employed, but, due to the instability of t-butyl formate at temperatures convenient for the separation and condensation of unconverted low boiling hydrocarbons, for economic reasons, it is not the acid of choice. Mixtures of these lower alkanoic acids can also be used, but they will produce mixed t-butyl esters. If isobutylene is to be produced, then mixtures of the lower alkanoic acid will give substantially the same results as obtained with one acid alone.

The molar ratios of the lower alkanoic acid to the isobutylene in the refinery stream can be varied widely and still be within the scope of the present invention. However, since it is a purpose of this invention to effect the optimum removal of isobutylene from the refinery stream and since one mole of isobutylene reacts with one mole of acid, at least one mole acid for each mole of isobutylene present in the refinery stream is generally used. More than one mole of acid may be preferred since an excess of acid, i.e. more than one mole per mole of isobutylene, increases the efficiency of the recovery of isobutylene and the excess acid can be recycled in the process. Thus, as high as 10 moles acid per mole isobutylene may be used when maximum recovery of isobutylene is desired. For optimum recovery of isobutylene from the refinery stream, 1.0 to 3.0 moles acid per mole of isobutylene are employed.

The reaction is exothermic and, since reversal of the addition reaction may occur at higher temperatures, external cooling is generally necessary. Higher temperatures should also be avoided because they favor the polymerization of isobutylene, a non-reversible reaction under the experimental conditions herein described.

The reaction temperature should be controlled in the range of about −10° C. to about 50° C. A preferred range is 0° to 25° C. It has been found that it is possible to operate satisfactorily at higher temperatures using the refinery streams with relatively low isobutylene contents than is the case when using substantially pure isobutylene.

The pressure employed is not critical, but it is preferred to use a pressure which will maintain the reactants in a liquid condition. Atmospheric pressure is generally satisfactory, but when employing low boiling olefins, such as isobutylene, increased pressure up to five atmospheres may be employed. There is no objection to the use of pressures as high as 300 atmospheres. However, superatmospheric pressure is used primarily to maintain the reactants in the liquid phase.

A batch process in which the refinery stream is forced into the acid in the presence of the sulfonic cation exchange resin while the mixture is being agitated can be satisfactorily employed. The process may be made continuous by using a staged reactor, or two or three batch reactors in series, continuously pumping into the reactors the refinery stream and the acid in the desired mole ratio, either as a premix or separately and withdrawing reactor effluent at a rate equal to the charging rate after the desired average contact time in the reactors has been achieved. This time may be from 5 minutes to 6 hours, depending upon the amount of catalyst employed and the temperature maintained in the reactors. A preferred continuous method employs a fixed bed or column of the sulfonic cation exchange resin and a cooled mixture of refinery stream and lower alkanoic acid is pumped through the bed. In the case of acetic acid, a residence time in the bed of 15 to 30 minutes is sufficient to effect reaction. The effluent from the bed, completely freed from resin particles, is stripped of low boiling unreacted materials and fractionated at atmospheric pressure. When employing acetic acid as the lower alkanoic acid, pure t-butyl acetate is obtained as the distillate in 90% to 100% yield and 50% to 80% conversion based on the isobutylene present in the original refinery stream. No other esters and only traces of diisobutylene and t-butanol are formed. The residue from the distillation is glacial acetic acid which may be recycled directly.

In some instances, particularly if the isobutylene content of the refinery stream exceeds about 30%, it may be advantageous to combine the stirred reactor and the fixed bed continuous processes.

The t-butyl lower alkanoates prepared as set forth hereinbefore can be very readily utilized to produce pure isobutylene from refinery streams which have only relatively low isobutylene content. The t-butyl lower alkanoates can be refluxed with strong acids to produce pure isobutylene and the free acid. Thus, refluxing with mineral acids, such as sulfuric acid, will effect the release of isobutylene. Such so-called homogeneous catalysts are not preferred because their use requires the further purification of the lower alkanoic acid before it can be recycled. Sulfonic acid type cation exchange resins are preferred because they can be readily removed from the lower alkanoic acid prior to its recycle. Dehydrated sulfonic acid type cation exchange resins possessing macro-reticular structures are particularly preferred because of their fast reaction rates. If it is desired to convert the t-butyl lower alkanoates to isobutylene, then it is not necessary to fractionate the reaction mixture which remains after the stripping of the low boiling unreacted hydrocarbons. This residual reaction mixture consists of the t-butyl lower alkanoate and any unreacted lower alkanoic acid. On refluxing this residual reaction mixture with the sulfonic acid type cation exchange resin, the isobutylene is readily removed as formed, leaving only the alkanoic acid which can be directly recycled to the process without further purification.

The reaction time required for the conversion of the t-butyl lower alkanoates to isobutylene and the free acid will vary somewhat depending upon the amount of catalyst used and on the boiling point of the ester employed. In the case of t-butyl acetate, over 90% of the ester had been converted to pure isobutylene and glacial acetic acid after one hour at reflux temperature.

Another variation of the process of the present invention comprises charging to an autoclave a mixture consisting of a lower alkanoic and a dehydrated sulfonic acid type cation exchange resin, cooling said mixture to the desired temperature range as hereinbefore set forth, introducing to said autoclave a mixture of gases containing isobutylene, allowing the isobutylene and lower alkanoic acid to react for a period of time as set forth hereinbefore, evacuating the autoclave to a pressure at which the unreacted gases are removed from the reaction mixture, and then heating the entire reaction mixture in the presence of the dehydrated cation exchange resin, and collecting the pure isobutylene so formed.

By this process a very pure grade of isobutylene is obtained in excellent yield and purity by a process which is very simple and avoids the use of distillation columns containing a large number of plates, the use of large amounts of sulfuric acid and the process step of depolymerization of isobutylene polymers and the necessary careful fractionation of the resulting crude isobutylene.

The uses of isobutylene as a raw material for the manufacture of polymers or for the preparation of t-butyl esters of numerous organic acids are well-known. The esters prepared by this process are well-known compounds of commerce with well-established uses. Thus, the esters are of value as solvents for lacquers and for the preparation of solutions of other resins, which solutions can be used as impregnants, adhesives, coatings, etc.

The compositions of refinery streams generally used as raw materials for the preparation of isobutylene will vary somewhat from refinery to refinery but generally contain about 15 to 20 liquid volume percent isobutylene. An analysis of a typical stream, as determined by vapor phase chromatography is:

TABLE I

*Vapor Phase Chromatography Analysis, Liquid Volume Percent*

| | |
|---|---|
| $C_1+C_2$ less than | 0.1 |
| Propane | 1.9 |
| Propylene | 0.8 |
| Isobutane | 31.0 |
| Normal butane | 15.7 |
| Isobutylene | 16.9 |
| Butene-1 | 5.6 |
| Butene-2, cis | 10.2 |
| Butene-2, trans | 13.5 |
| Isopentane | 3.2 |
| Normal pentane | 0.1 |
| $C_5$ olefins | 1.1 |
| $C_6+$ | 0.0 |
| Sulfur, wt. percent | 0.056 |
| Mercaptan sulfur, p.p.m. | 20. |
| Water, percent (DK-2) | 0.007 |

The following examples set forth certain well-known defined embodiments of the application of this invention. They are not, however, to be considered as limitations thereof, since many modifications may be made without departing from the spirit and scope of this invention.

Unless otherwise specified, all parts are parts by weight. Unless otherwise noted, all temperatures are centigrade.

EXAMPLE IA

To 3,650 grams of the refinery stream of the composition set forth in Table I (isobutylene content 616 grams (11 moles)) in a low pressure reservoir was added 660 grams (11 moles) of glacial acetic acid. This solution, after thorough mixing, was pumped through a pre-cooler until cooled to 0° C. and then through a bed of 88 grams of a sulfonated styrene-divinylbenzene copolymer possessing a macro-reticular structure (dry basis) packed in a stainless steel cylinder 1½" x 6" which was immersed in an ice water bath. The pressure on the system was maintained at 60–80 p.s.i.g. to assure that all materials were in the liquid phase. Pumping rate was 9–10 ml./minute and the temperature in the bed rose to about 10° to 13° C. and was maintained in this range during the entire run. The reactor effluent was collected in a receiver also maintained at 70 p.s.i.g. From here it discharged through a let-down valve into a flask which was heated to 75° C. The unreacted materials flashed off and were collected in a series of traps cooled in a Dry Ice bath. The residue was allowed to build up in the flask. After 5½ hours, the pumping was discontinued. During this time, 2400 grams of reaction mixture (6 moles of isobutylene, 6 moles of acetic acid) had been pumped through the catalyst bed. The residue amounted to 545 grams. Analysis indicated that it was 34.7% acetic acid and 62% to 64% t-butyl acetate. This represents a 49% to 50% conversion of the acid and isobutylene charged and a 97% to 99% yield of t-butyl acetate based on the acetic acid consumed. The residue (540 grams) was fractionated through a 30 plate sieve plate column using a reflux ratio of 5:1. There was obtained 22 grams of forerun, B.P. 75° to 95° C., which analyzed by gas chromatography to be over 90% t-butyl acetate, 280 grams of product cut, B.P. 96° to 98° C., which analyzed to be over 99% pure t-butyl acetate, 174 grams of acetic acid, B.P. 117° to 118° C., and a small amount of residue which was essentially column hold-up. Careful examination of the product cut and the recovered acetic acid showed complete absence of esters other than t-butyl acetate. Traces of t-butanol and diisobutylene were noted in the forerun cut.

EXAMPLE IB

A mixture of 300 grams of t-butyl acetate and 30 grams of glacial acetic acid was charged to a flask equipped with a thermometer and reflux condenser and refluxed 4 hours, the reaction mixture temperature being 99° C. Analysis after this treatment indicated complete stability of the t-butyl acetate, the acid number showing no change whatsoever.

The solution was cooled and 3 grams of a sulfonated styrene-divinylbenzene copolymer possessing a macro-reticular structure was added, then warmed. When the temperature reached about 60° C., isobutylene started being evolved in copious quantities. It was impossible to raise the pot temperature to 99° C. until over about 85% of the theoretical amount of isobutylene had been recovered. After one hour of heating, evolution of gas had slowed down but not completely ceased. Analysis of the reaction mixture indicated it to be 89% acetic acid and 11% t-butyl acetate. There was collected 110 grams of isobutylene. After correcting for samples removed for analysis, the conversion of t-butyl acetate to isobutylene and acetic acid exceeded 90%, and the yield based on material converted was quantitative.

EXAMPLE II

To 3,320 grams of the refinery stream of the composition set forth in Table I (isobutylene content 560 grams (10 moles)) in a low pressure reservoir was added 1,200 grams (20 moles) of glacial acetic acid. The pre-cooled mixture was pumped through a bed of 80 grams of resin as described in Example I. Pumping rate was 15 ml./minute and the temperature in the bed rose to 11° C. The reactor effluent was collected and from a portion of it the t-butyl acetate isolated as described above. In this case, the conversion of the isobutylene was 70% to 72%, the conversion of acetic acid was 35% to 36%. Yields based on converted material were 96% to 97%, and 99% respectively. The product contained no ester other than t-butyl acetate and only traces of diisobutylene.

A second portion of the reactor effluent was heated to 90° C. to remove the last traces of unconverted $C_4$ and $C_5$ olefins. The solution was cooled and 1% of a dehydrated sulfonated styrene-divinylbenzene copolymer was added, then the stirred mixture warmed. When the temperature reached 55° C., isobutylene began to evolve. After one and one-half hours of heating, the batch temperature had reached 105° C. During this time, 0.95 mole of isobutylene per mole of t-butyl acetate present in the reactor effluent was collected. The crude isobutylene was distilled through a short fractionating column to remove traces of t-butyl acetate and acetic acid which had been entrained. Analysis of the purified isobutylene indicated that it was greater than 99% pure.

EXAMPLE III

To a low pressure autoclave equipped with a stirrer, cooling coil and thermowell, which extended to within one inch of the bottom of the autoclave, was charged 220 grams (2.5 moles) of n-butyric acid and 25 grams (dry basis) of a dehydrated sulfonated styrene-divinylbenzene copolymer possessing a macro-reticular structure. The autoclave was sealed, stirring started and the mixture cooled to 5° C. Then over a period of one-half hour was pumped in 665 grams of the refinery gas described in Table I (isobutylene content 2.0 mole), the temperature being maintained at 3° to 5° C. The reaction mixture was stirred for an additional one and one-half hours. The autoclave was then vented, the unconverted materials being collected in a series of Dry Ice traps. The remaining material was filtered to remove the copolymer, then heated to 100° C. to remove last traces of $C_4$ to $C_5$ olefins. Analysis of the product indicated that it was essentially a two-component system containing 1.55 moles of t-butyl butyrate and 0.95 mole of butyric acid. This represents a conversion of 77.5% of the isobutylene and 62.0% of the butyric acid originally charged to the autoclave. No esters other than t-butyl butyrate could be detected and only traces of diisobutylene were formed. The t-butyl butyrate was recovered from the reaction mixture by fractional distillation.

EXAMPLE IV

To an autoclave equipped with efficient stirrer, a cooling coil and a fractionating column was charged 420 grams (7 moles) of acetic acid, 60 grams of t-butyl acetate and 40 grams of a dehydrated sulfonated styrene-divinylbenzene copolymer possessing a macro-reticular structure (dry basis). Stirring was started, the system pressurized to 20 pounds with nitrogen and the contents cooled to 5° C. A refinery stream of the composition used in Example I was then pumped into the autoclave at such a rate that 1,650 grams (isobutylene content 5 moles) was added over a period of 30 minutes. The batch was stirred for an additional one and one-half hours. The temperature was maintained at 0° to 5° C. during the entire period. Analysis after one and one-half hours indicated that 78% of the isobutylene in the refinery stream had been converted to t-butyl acetate. The autoclave was vented and then slowly evacuated to remove unreacted hydrocarbons by fractional vacuum distillation; the temperature was not allowed to exceed 5° C. After one hour of vacuum distillation, the batch contained less than 1% hydrocarbons. The system was again vented to atmospheric pressure and then heat applied. When the temperature of the reaction mixture reached 45° C., evolution of isobutylene started slowly. At 55° C., the reaction rate was satisfactory. Over a period of two hours, the batch temperature was gradually increased to 105° C., and, at the end of this period, the isobutylene evolution had almost ceased. There was collected in Dry Ice-cooled traps 207 grams of isobutylene (purity 99%). This represents a conversion of the t-butyl acetate in the mixture to pure isobutylene of 95% or a recovery of isobutylene from the original refinery stream of 75%. The residue in the flask was cooled to 0° C. and a second portion of 1,650 grams of refinery stream added and the process repeated with identical results. In the third cycle, the amount of refinery stream was reduced to 1,150 grams (3.5 moles). In this case, the conversion of the isobutylene present in the charge was increased to about 85%.

EXAMPLE V

A crude wet refinery stream had the following compositon (volume percent):

| | |
|---|---|
| Propylene | 2.5 |
| Isobutane | 26.3 |
| Normal butane | 13.7 |
| Isobutylene | 22.5 |
| Butene–1 | 7.2 |
| Butene–2 | 24.2 |
| $C_5$ and $C_6$ olefins | 3.1 |
| Water | 0.5 |

To 2000 grams of the above refinery stream (isobutylene content 8 moles) in a low pressure reservoir was added 558 grams (9.3 moles) of acetic acid and 61 grams (0.6 mole) of acetic anhydride. This solution after thorough mixing was passed through a heating coil at 80° C., wherein all of the acetic anhydride reacted with the water to yield 1.1 moles of additional acetic acid, then cooled to 0° C. and pumped through a bed of 70 grams of a dehydrated sulfonated styrene-divinylbenzene copolymer possessing a macro-reticular structure packed in a steel cylinder 1½" x 6" which was immersed in an ice-water bath. Pumping rate was 15 ml./minute and the temperature of the catalyst bed rose to 15° to 18° C. and stayed within this range for the duration of the run.

The pressure on the system was maintained at 50 to 55 p.s.i.g. The reactor effluent discharged through a let-down valve into a flask which was heated to 75° C. The unreacted hydrocarbons flashed off and were collected. The residue was allowed to build up in the flask. Analysis indicated that it contained 63.5% t-butyl acetate, 35% acetic acid, 0.05% acetic anhydride and 1.4% inert materials. This represents a conversion of 63% on the isobutylene charged to the system.

To the residue which amounted to 915 grams was added 12 grams of a dehydrated sulfonated styrene-divinylbenzene copolymer and the stirred mixture heated. When the temperature reached 60° C., evolution of isobutylene was occurring at a rapid rate. After two hours, the reaction mixture reached a temperature of 105° C. and the evolution of isobutylene had almost ceased. The isobutylene collected amounted to 270 grams, the purity exceeded 98%. This represents a conversion of t-butyl acetate to isobutylene of 93% to 94%. The residue in the flask was 90% acetic acid, 7% t-butyl acetate, and 3% inerts. It was suitable for recycle without any purification.

I claim:

1. A process for the separation of isobutylene from a mixture of hydrocarbon gases containing isobutylene and normal olefins which comprises contacting said mixture with a lower alkanoic acid containing 1 to 4 carbon atoms for from about five minutes to about six hours in the presence of a dehydrated sulfonic acid cation exchange resin which possesses a macro-reticular structure at a temperature from about −10° C. to about 50° C., whereby said isobutylene and said lower alkanoic acid react whereby a t-butyl lower alkanoate is formed, separating said resin and said reaction mixture, taking off the unreacted gases from the mixture, distilling the reaction mixture, recovering t-butyl lower alkanoate, heating under reflux said t-butyl lower alkanoate in the presence of a dehydrated sulfonic acid type cation exchange resin which possesses a macro-reticular structure, and taking off the isobutylene so produced.

2. A process as set forth in claim 1 in which the lower alkanoic acid is glacial acetic acid.

3. A process as set forth in claim 1 in which the cation exchange resin is a cross-linked insoluble sulfonated styrene resin.

4. A process as set forth in claim 3 in which the styrene resin is a styrene-divinylbenzene copolymer.

5. A process for the separation of isobutylene from a mixture of hydrocarbon gases containing isobutylene and normal olefins which comprises contacting said mixture for from about five minutes to about six hours with a lower alkanoic acid containing 1 to 4 carbon atoms in the presence of a dehydrated sulfonic acid cation exchange resin which possesses a macro-reticular structure at a temperature of from about −10° C. to about 50° C., whereby said isobutylene and said lower alkanoic acid react whereby a t-butyl alkanoate is formed, separating said resin and said reaction mixture, removing the unreacted gases from the reaction mixture, refluxing the reaction mixture in the presence of a dehydrated sulfonic acid type cation exchange resin which possesses a macro-reticular structure, and recovering the isobutylene so produced.

6. A process as set forth in claim 5 in which the lower alkanoic acid is glacial acetic acid.

7. A process as set forth in claim 5 in which the cation exchange resin is a sulfonated styrene-divinylbenzene copolymer.

8. A process for the separation of isobutylene from a mixture of hydrocarbon gases containing isobutylene and normal olefins which comprises contacting said mixture with a lower alkanoic acid containing 1 to 4 carbon atoms in the presence of a dehydrated sulfonic acid type cation exchange resin which possesses a macro-reticular structure at a temperature of from about 0° C. to 25° C., whereby said isobutylene and said lower alkanoic acid react whereby a t-butyl alkanoate is formed, separating said resin and said reaction mixture, removing the unreacted gases from the reaction mixture, refluxing the reaction mixture in the presence of a dehydrated sulfonic acid type cation exchange resin which possesses a macro-reticular structure, and recovering the isobutylene so produced.

9. A process for separation and utilization of isobutylene present in a mixture of hydrocarbon gases containing isobutylene and normal olefins which comprises contacting said mixture with a lower alkanoic acid containing 1 to 4 carbon atoms in the presence of a dehydrated sulfonic acid type cation exchange resin which possesses a macro-reticular structure at a temperature of from about −10° C. to about 50° C., whereby said isobutylene and said lower alkanoic acid react whereby a t-butyl lower alkanoate is formed, removing said resin from the reaction mixture, taking off the unreacted gases from the mixture, distilling the reaction mixture, and recovering the t-butyl lower alkanoate.

10. A process as set forth in claim 9 in which the lower alkanoic acid is glacial acetic acid.

11. A process as set forth in claim 9 in which the dehydrated cation exchange resin is a sulfonated styrene-divinylbenzene copolymer.

12. A process for the separation of isobutylene from a mixture of hydrocarbon gases containing isobutylene and normal olefins which comprises charging to a reaction vessel (a) alkanoic acid containing 1 to 4 carbon atoms and (b) a dehydrated sulfonic acid cation exchange resin which possesses a macro-reticular structure, maintaining the resulting mixture at a temperature from about −10° C. to about 50° C., introducing into the reaction vessel (c) said mixture of gases, reacting isobutylene in said mixture with said alkanoic acid in the presence of the cation exchange resin, whereby a t-butyl lower alkanoate is formed, subjecting the reaction vessel to reduced pressure, removing unreacted gases therefrom, heating the reaction mixture therein under reflux, and collecting the isobutylene so formed.

13. A process as set forth in claim 12 in which the lower alkanoic acid is glacial acetic acid.

14. A process as set forth in claim 12 in which the cation exchange resin is a cross-linked insoluble sulfonated styrene resin.

15. A process as set forth in claim 14 in which the styrene resin is a sulfonated styrene-divinylbenzene copolymer.

16. A process for the recovery of isobutylene from a mixture of hydrocarbon gases containing isobutylene and normal olefins and having a moisture content which comprises mixing said mixture with a lower alkanoic acid and a lower alkanoic acid anhydride, said anhydride being present in an amount at least equivalent to the moisture content of the mixture of gases and to any water in the lower alkanoic acid, heating the resulting mixture at a temperature from about 50° C. to about 90° C. to react anhydride with water, bringing this mixture to a temperature from about −10° to about 35° C., adding thereto a dehydrated sulfonic acid type cation exchange resin which possesses a macro-reticular structure, reacting said isobutylene with said lower alkanoic acid, removing said cation exchange resin from the reaction mixture, removing gases from the mixture, distilling the reaction mixture, recovering a fraction containing t-butyl lower alkanoate, refluxing said fraction in the presence of a dehydrated sulfonic cation exchange resin, and recovering the isobutylene so produced.

17. A process as set forth in claim 16 in which the lower alkanoic acid is glacial acetic acid.

18. A process as set forth in claim 16 in which the cation exchange resin is a cross-linked insoluble sulfonated styrene resin.

19. A process for the preparation of t-butyl lower alkanoate from a mixture of hydrocarbon gases containing isobutylene and normal olefins which comprises contacting said mixture with a lower alkanoic acid containing 1 to 4 carbon atoms for from about five minutes to about six hours in the presence of a dehydrated sulfonic acid cation exchange resin which possesses a macro-reticular structure at a temperature from about −10° C. to about 50° C., whereby said isobutylene and said lower alkanoic acid react whereby a t-butyl lower alkanoate is formed, separating said resin and said reaction mixture, taking off the unreacted gases from the mixture, distilling the reaction mixture, and recovering t-butyl lower alkanoate.

20. A process as set forth in claim 19 in which the lower alkanoic acid is glacial acetic acid.

References Cited in the file of this patent

UNITED STATES PATENTS

| | | |
|---|---|---|
| 2,386,772 | Badertscher et al. | Oct. 16, 1945 |
| 2,515,006 | Hudson | July 11, 1950 |
| 2,678,332 | Cottle | May 11, 1954 |

FOREIGN PATENTS

| | | |
|---|---|---|
| 590,613 | Great Britain | July 23, 1947 |

OTHER REFERENCES

Sussman: Industrial and Engineering Chemistry, Dec., 1946, pp. 1228–1230.

Royals: Advanced Organic Chemistry, Constable and Co., Ltd., London, received December 14, 1955, pages 379, 380 and 607.